United States Patent [19]
Meynig

[11] 4,100,939
[45] Jul. 18, 1978

[54] TIME CYCLE ACTUATOR

[76] Inventor: Robert E. Meynig, 2609 Sheraton, Denton, Tex. 76201

[21] Appl. No.: 710,172

[22] Filed: Jul. 30, 1976

Related U.S. Application Data

[62] Division of Ser. No. 632,341, Nov. 17, 1975, Pat. No. 3,993,098.

[51] Int. Cl.² ............................................. G05D 7/00
[52] U.S. Cl. .............................. 137/627.5; 137/596.2; 137/625.68; 137/624.14
[58] Field of Search .............. 137/596, 625.68, 625.69, 137/627.5, 596.2

[56] References Cited

U.S. PATENT DOCUMENTS

| | | | |
|---|---|---|---|
| 1,360,396 | 11/1920 | Havens | 137/625.68 |
| 2,646,820 | 7/1953 | McLeod | 137/596 X |
| 2,742,922 | 4/1956 | Frellsen | 137/625.69 |
| 3,076,476 | 2/1963 | Campbell | 137/625.68 |
| 3,095,011 | 6/1963 | Banker | 137/625.69 |
| 3,348,576 | 10/1967 | Ackerman | 137/625.68 X |

Primary Examiner—Alan Cohan
Attorney, Agent, or Firm—Gerald G. Crutsinger; Larry B. Dwight

[57] ABSTRACT

A time cycle actuator having first and second chambers pivotally secured on opposite sides of a support such that a fluid may flow through a flow control valve from one chamber to the other. The chambers are arranged to move a valve element in a valve block to allow flow from an inlet supply line to one of two exhaust lines. The fluid passes from the first chamber to the second chamber thus causing the second chamber to move, actuating the valve to allow flow through the first exhaust line. The first exhaust line is connected to one side of an actuated valve, and a reset means moves the second chamber to higher position to reverse the flow of fluid back to the first chamber. When a predetermined amount of fluid has flowed back to the first chamber the valve is moved to the second position allowing pressure to be applied to the second exhaust line. The second exhaust line is connected to resetting means and moves the actuated valve to the second position.

5 Claims, 7 Drawing Figures

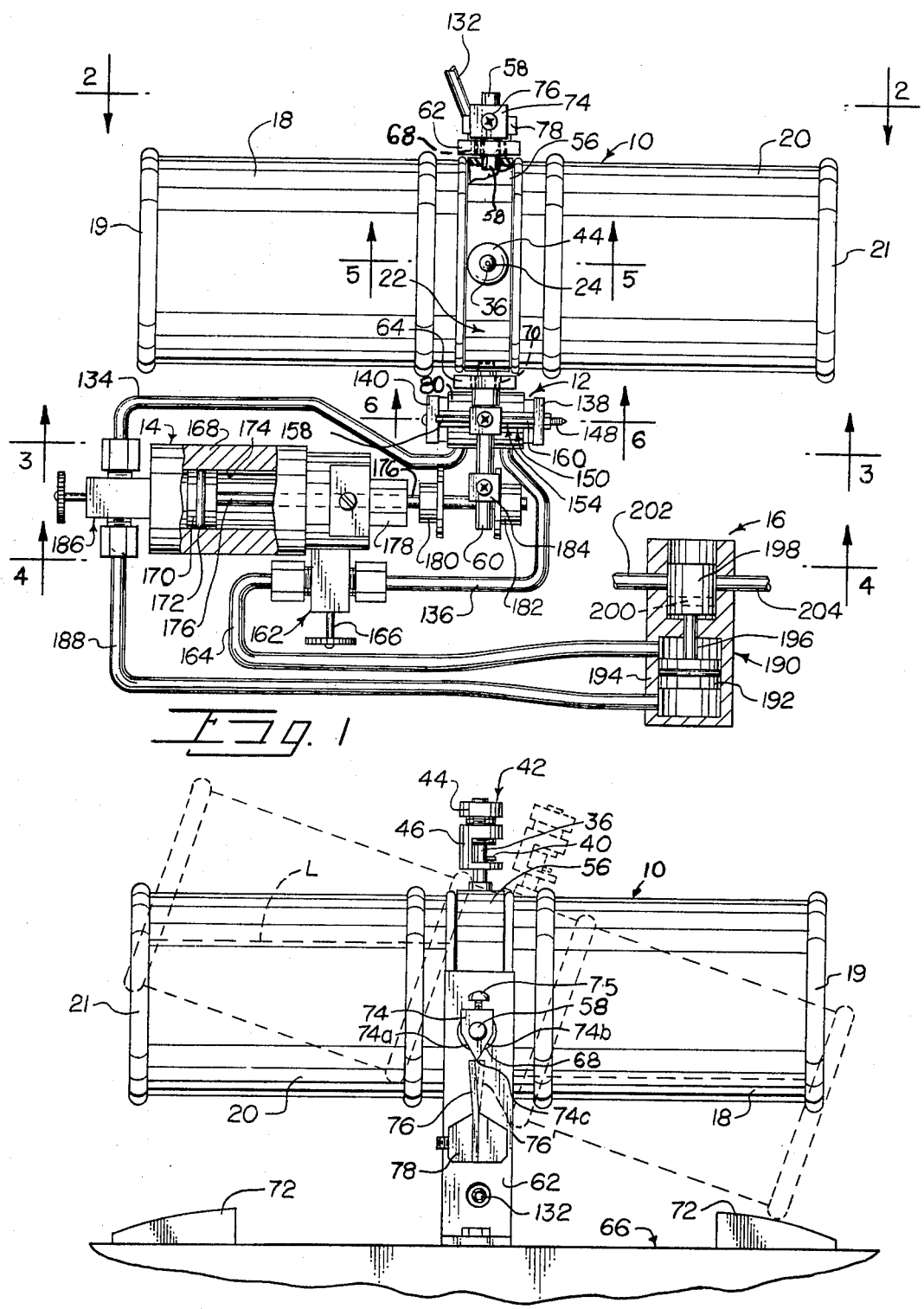

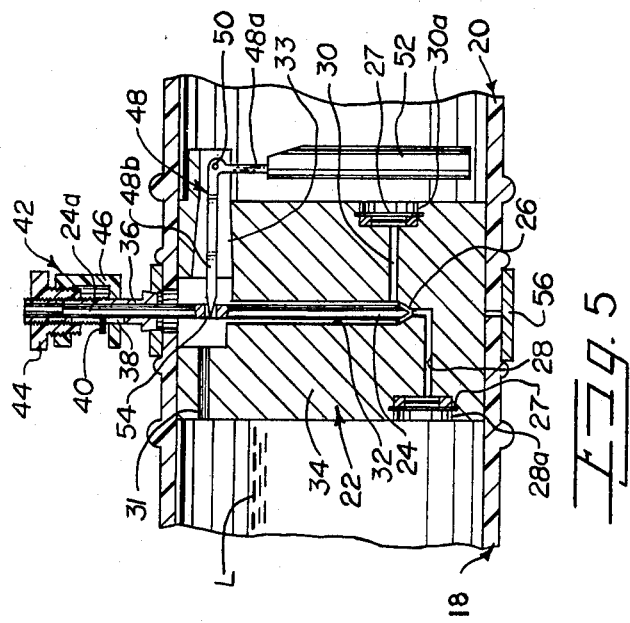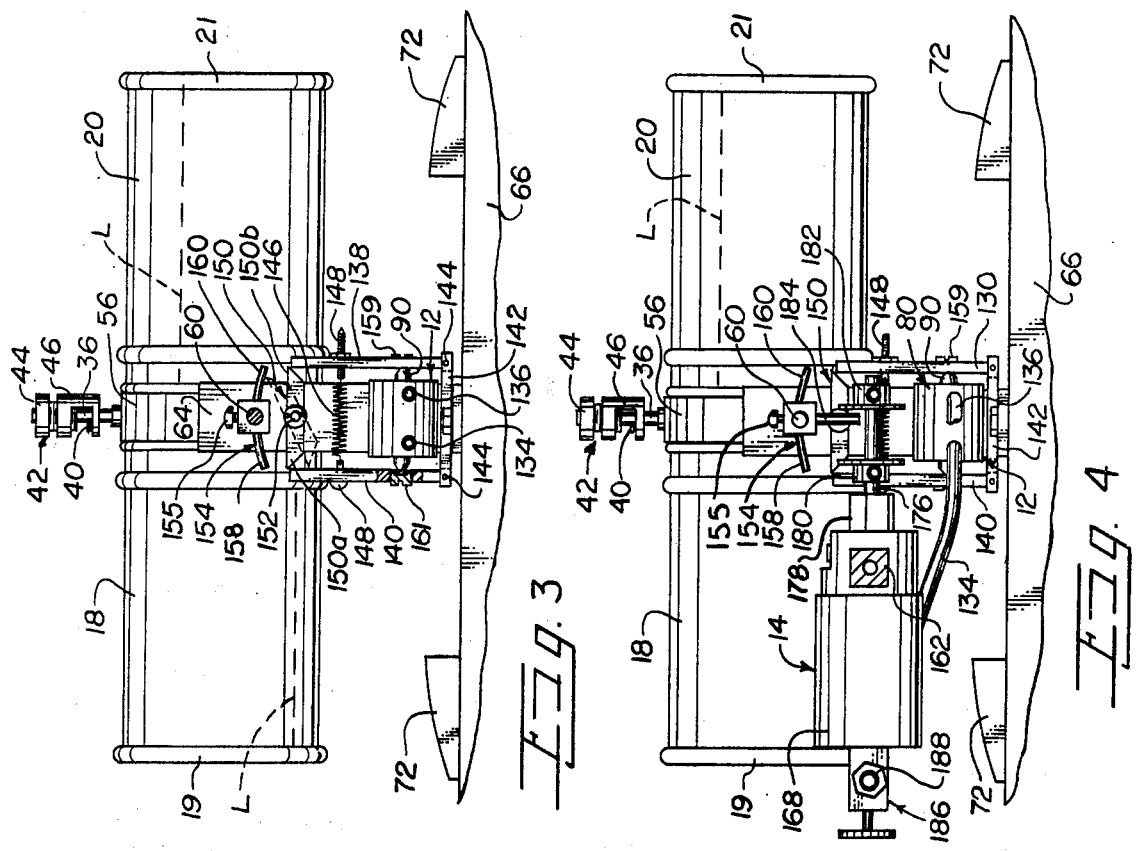

TIME CYCLE ACTUATOR

This is a division, of application Ser. No. 632,341, filed Nov. 17, 1975 now U.S. Pat. No. 3,993,098 granted Nov. 23, 1976.

BACKGROUND OF THE INVENTION

Heretofore, many time cycle actuator devices have depended upon electricity for a source of power. Power failures interrupt the timing of these devices. Many uses of the timers, such as in oil fields, require that the timed cycle not be interrupted.

Other devices require control valves which require the valve element to travel a relatively long distance or rotation of a valve stem to control the flow through the valve.

Hereinbefore no time cycle actuator has had a valve means actuated by only a slight movement of the valve element such as a few thousandths of an inch which shifts the flow of fluid from one side to the other.

SUMMARY OF INVENTION

I have developed a time cycle actuator having a pair of ballast chambers pivotally secured to a shaft on a support member. Flow of liquid from the first ballast chamber to the second ballast chamber is controlled by a needle valve which is connected to a counterweight pivotally secured to the divider structure. A counterweight moves the needle in and out of the valve seat and a pin on the needle is slideably disposed in a support sleeve to limit the upper and lower movements of the needle valve. The chambers are balanced by a leaf spring until a predetermined amount of fluid has flowed from the first chamber to the second chamber to move the chamber past the leaf spring to a lower position. When in the lower position, an arm on the shaft of the support pivots to engage a cam. The cam moves two upwardly extending arms to move the valve element thus allowing passage to a first exhaust conduit. The first exhaust conduit is connected to a reset means and an actuated valve means. The reset means comprises a cylinder having a piston and piston rod with collars disposed on said piston rod. The collars engage a rod connected to the shaft of the pivot support, moving the shaft clockwise, causing the first chamber, which was previously above the second chamber, to move below the second chamber and the second chamber is moved higher than the first chamber to reverse the flow of fluid through the flow control means.

When a predetermined amount of fluid has flowed through the first chamber then the leaf spring is tripped again and the first chamber moves to a lower position, reversing the position of the cam, and moving the valve element and the valve means to allow passage of a presurized fluid to a second exhaust means which is connected to the opposite sides of the reset cylinder, extending the piston rod and moving the collar to move the shaft of the pivot support in the opposite direction, reversing the whole process. In addition, the second exhaust conduit is connected to the other side of the actuated valve means.

A primary object of the invention is to provide a time cycle actuator which has a self-contained timing mechanism to prevent interruptions of the cycles.

A further object of the invention is to provide a time cycle actuator having a valve element which requires minimal movement and thus is reliable.

A still further object of the invention is to provide a timing mechanism for pressure actuated devices.

A still further object of the invention is to provide a timing device which is not sensitive to temperature changes and therefore provides more even accurate timing cycles for the actuated device.

A still further object of the invention is to provide a device which is capable of providing a short time cycle and a long time cycle which is adjustable to vary the time which the actuated device is opened and closed.

Other and further objects of the invention will become apparent upon studying the detailed description and the drawings annexed hereto.

DESCRIPTION OF THE DRAWINGS

Drawings annexed hereto so that the invention may be better and more fully understood:

FIG. 1 is a plan view of the time cycle actuator;

FIG. 2 is a side elevational view taken along line 2—2 of FIG. 1;

FIG. 3 is an elevational view taken along line 3—3 of FIG. 1;

FIG. 4 is a side elevational view taken along line 4—4 of FIG. 1;

FIG. 5 is a cross-sectional view taken along line 5—5 of FIG. 1;

Numeral references are employed to designate parts in the drawings and like numerals are used to designate like parts throughout the various figures of the drawing.

DESCRIPTION OF A PREFERRED EMBODIMENT

Figure 6:
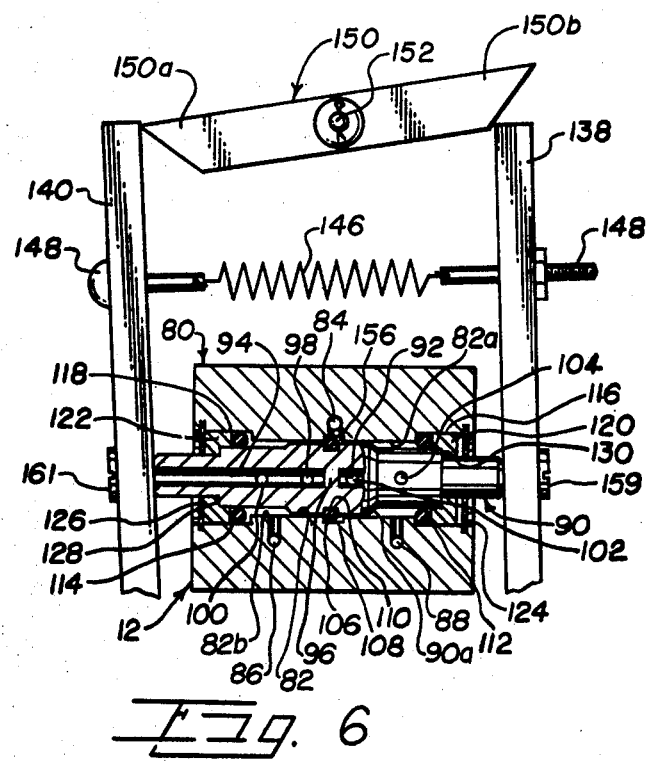
FIG. 6 is an enlarged cross-sectional view taken along line 6—6 of FIG. 1 showing the valve element in a first position.

Referring to FIGS. 1 and 2 the time cycle actuator comprises a timing means 10 for controlling valve movement, a valve means 12 for controlling flow of fluid such as air or liquid, a reset means 14 to reset the timing means 10, and an actuated means 16.

The timing means 10 comprises a pair of liquid holding chambers 18 and 20 secured to the flow control means 22 as illustrated in FIGS. 1-5. As illustrated in the preferred embodiment, the chambers comprise a hollow cylindrical chamber having ends 19 and 21. The other ends of chambers 18 and 20 communicate with flow control means 22. A liquid such as silicone is placed in the chambers 18 and 20.

The flow control means 22 comprises a needle valve having a needle 24, a seat 26, with a first passage 28 communicating with chamber 18 on the lower side of seat 26 and a second passage 30 communicating with the upper side of seat 26 and chamber 20. Screens 27 are provided in counterbore passages 28a and 30a to filter the liquid as it passes therethrough.

It should be readily apparent that flow of the silicone liquid passes from chamber 18, through passage 28, through the seat 26, around needle valve 24, and through passage 30 into chamber 20 by gravity with the rate of flow controlled by the position of needle valve 24. An air vent passage 31 equalizes pressure between chambers 18 and 20.

A bore 32 is formed above seat 26 in divider block 34 through which needle valve 24 is slideably disposed. As best illustrated in FIG. 5, the upper end 24a of needle valve 24 is slideably disposed through sleeve 36. Sleeve 36 has a slot 38 formed therein such that pin 40, rigidly secured to the upper end 24a of needle valve 24, is slideably disposed therethrough and free to move vertically in slot 38. A flow control adjustment means 42 has an upper stop means 44 threadedly secured to sleeve 36 and a lower stop means 46 threadedly secured to upper stop means 44 as illustrated in the preferred embodiment.

The stop means 44 and 46 are preferably constructed of a material such as plastic which expands relatively little during temperature changes and therefore has constant dimensions, providing the necessary accuracy required during temperature changes.

Counterweight arm 48 is pivotally secured by pin 50 to divider block 34 and is slideably disposed through passage 33 in block 34. Counterweight 52 is rigidly secured to extension 48a of counterweight arm 48 and end 48b of counterweight arm 48 is tapered or pointed and fits into an aperture 54 formed in needle valve 24 such that movement of counterweight 52 pivots end 48b to move needle valve 24 vertically up or down in bore 32.

It should be readily apparent that movement of needle valve 24 is limited on the upper region by upper stop 44 and on the lower region by lower stop 46, thereby providing a means to control the flow of liquid through seat 26 by needle valve 24.

When chamber 20 is lower than chamber 18, gravity will cause flow of the silicone liquid through needle valve 24 and counterweight 52 will move needle valve 24 to its lower extremity by moving end 48b of counterweight arm 48 downward. When needle valve 24 is in the lowest position the liquid silicone will require a longer time to pass from chamber 18 to 20. When chamber 20 is lower than chamber 18, counterweight 52 will move needle valve 24 to its upper extremity, opening passage 26 to its maximum desired opening, and the liquid silicone will pass from chamber 20 to chamber 18 faster as needle valve 24 will be opened wider.

From the foregoing it should be readily apparent that the time cycle actuator can be regulated to have a long and a short cycle, although by placing the upper and lower stops limits 44 and 46 against the pin 40 preventing it from moving one can have equal cycle movements between the two chambers.

The silicone liquid L can be of varying viscosity depending upon the time it is desired for the liquid to flow between the two chambers 18 and 20. It is desirable that silicone liquid be used as silicone has a constant viscosity at various temperatures. Density and viscosity of the liquid together with the size of the valve opening in seat 26 determine the rate of flow between chambers 18 and 20. However, it should be appreciated that other liquids may be used when accuracy in the time cycle is not critical.

A connecting means such as flange 56 joins chambers 18 and 20 and may be rigidly secured thereto by means of adhesive or the like.

Shafts 58 and 60 are rigidly secured to flange 56 and are axially aligned and journalled through bearings 68 and 70 in support members 62 and 64 which are rigidly secured to a base 66 by means of bolts or the like. Base 66 has bumpers 72 formed of rubber in the preferred embodiment to limit the downward movement of chambers 18 and 20 for reasons to be hereinafter explained.

As illustrated in FIGS. 1-4, the silicone level L is higher in chamber 20 than in chamber 18 such that flow is from chamber 20 to chamber 18 which is slightly lower in elevation than chamber 20. Means is provided to balance chamber 18 in slightly lower position as the fluid flows from chamber 20 to 18 until the predetermined amount of fluid has flowed from chamber 20 to chamber 18, at which time chamber 18 is lowered to a second position against bumper 72.

The means that balances chamber 18 in a slightly lower position in chamber 20 comprises a knife edge 74 rigidly secured to shaft 58 by screw 75 and a leaf spring 76 adjustably secured to leaf spring mount 78 rigidly secured to support member 62. As best illustrated in FIG. 2 of the drawings, the leaf spring 76 is on the left edge 74a which is on the side of chamber 20 such that chamber 18 will be balanced in the first position until such time as a predetermined amount of fluid has filled chamber 18 thus causing movement in chamber 18 against bumper 72. Point 74c of knife edge 74 moves past the leaf spring 76 such that spring 76 is in a position 76' shown in dashed outline on edge 74b of the knife edge 74 thus allowing chamber 18 to move to the lower position against bumper 72 shown in dashed outline. Relative movement of the chambers 18 and 20 will be more fully discussed hereinafter.

The timing means 10 controls movement of the valve means 12 as will be hereinafter more fully explained.

Valve means 12 comprises a valve block 80, as best illustrated in FIG. 6 of the drawings having a bore 82 formed therethrough. Inlet 84 communicates with bore 82 and first and second outlet passages 86 and 88 with bore 82. The valve spindle or element 90 comprises a tubular member which has hollow passages 92 and 94 divided by a solid partition 96. Apertures 98 and 100 form passages between the bore 82 and interior bore 94 of valve element 90 on one side of partition 96 and apertures 102 and 104 form passages between the bore 82 and interior bore 92 of valve element 90 on the other side of partition 96. An O-ring 106 is positioned in groove 108 formed in valve body 80 and about groove 110 formed in valve element 90 and is aligned with inlet passage 84.

End O-rings 112 and 114 are positioned in counterbores 116 and 118 of valve block 80. Washers 120 and 122 are positioned about valve element 90 to hold O-rings 112 and 114 and are secured in place by snap rings 124 and 126.

Valve element 90 has shoulders 128 and 130 formed therein at a position such that neither shoulder is adjacent both washers at the same time to form a stop to limit longitudinal movement of valve element 90.

Inlet 84 is connected to supply conduit 132 and outlet passages 86 and 88 are connected to conduits 134 and 136, respectively.

As best illustrated in FIGS. 3 and 6 means to move valve element 90 longitudinally in bore 82 comprises arms 138 and 140 pivotally secured to base 142 by pins 144. Arms 138 and 140 are urged against the ends of valve element 90 by a resilient means such as spring 146 secured to arms 138 and 140 by adjusting screws 148.

It should be readily apparent that pivot pins 144 are located as close to valve element 90 as possible in order to provide only slight movement of the valve element 90 when arms 138 and 140 are moved.

Arms 138 and 140 extend upwardly from base 142 and are in sliding contact with cam 150 pivotally secured to rod 152 by a cotter pin or the like. Shaft 60 extending from flange 56 has actuating arm 154 rigidly secured thereto by means of screw 155 and ends 158 and 160 extend above cam 150 such that in the first position of chambers 18 and 20 neither end 158 or 160 touches cam 150.

However, it should be readily apparent that when liquid from chamber 20 has flowed to chamber 18 as previously described, chamber 18 trips leaf springs 76 to the position 76' and is then lowered to the position adjacent bumper 72 so that end 158 of actuating arm 154 will engage end 150a of cam 150, making end 150a rotate to a position lower than end 150b, thus moving arm 140 outward from the center of valve element 12 and moving arm 138 inward to the center such that valve element 90 is shifted toward arm 40.

When valve element 90 is shifted, as illustrated in FIG. 6, toward valve arm 140 O-ring 106 is shifted toward valve arm 140, creating a passage such that pressure of fluid communicating with inlet 84 passes into the bore 82 on end 82a communicates with aperture 102 through the interior bore 92 and out aperture 104 through outlet passage 88 into conduit 136.

The ends of valve element 90 are sealed by adjustable sealing elements 159 and 161 threadedly secured to arms 138 and 140.

As previously described, when arm 140 is pulled against the end of valve element 90 adjacent passage 94 the end is sealed by sealing element 161.

It should be readily apparent from the drawings that arm 138 is moved outwardly from the end of valve element 90 adjacent passage 92 thus venting said end 82a of bore 82 through apertures 102 and 104, passage 92 and open end of valve element 90 as best illustrated in FIGS. 3, 5, and 6. The reverse process occurs when arm 138 is moved against valve element 90 and arm 140 is moved away.

Conduit 136 is connected to T-valve 162 which communicates with reset means 14 and actuating supply line 164. The valve stem 166 regulates the pressure between supply line 164 and reset means 14.

As best illustrated in FIG. 1 reset means 14 comprises an air cylinder 168 having a piston 170 with a seal ring 172 disposed thereabout in bore 174. Piston 170 is connected to piston rod 176 which extends out of guide sleeve 178.

Pressure from line 136 into the cylinder 168 retracts piston rod 176. Piston rod 176 is connected to collars 180 and 182 such that retraction of the piston rod 176 causes collar 182 to move against rod 184, rigidly secured to shaft 60, rotating shaft 60 in a clockwise direction, moving chamber 20 to lower postion than chamber 18.

It should be readily apparent that when this occurs the liquid silicone will pass through passage 30, about needle valve 24, through seat 26, out passage 28, and into chamber 18.

Figure 7:
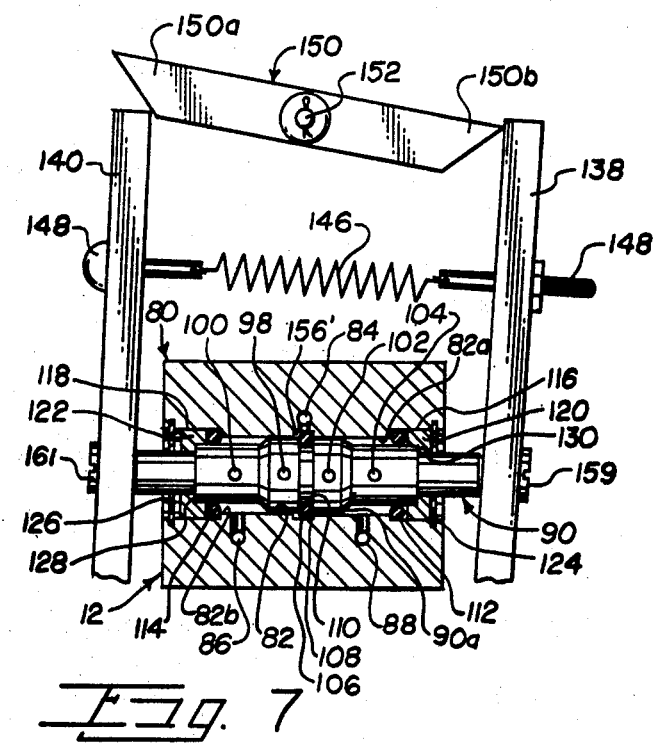
FIG. 7 is a cross-sectional view similar to FIG. 6 showing the valve element in a second position.

As best illustrated in FIG. 7, when chamber 18 is filled with a predetermined amount of silicone the knife edge 74 will move and leaf spring 76 moves from the dashed position 76' to the position shown in full outline 76 in FIG. 2 thus tripping chamber 20 to move the lower position against bumper 72. This moves actuating arm end 160 against cam end 150b which moves arm 138 outwardly and arm 140 inwardly, moving valve element 90 toward arm 138. Thus passage 156' is formed on the opposite side of O-ring 106 and passage 156 is closed. Pressure from inlet 84 passes through passage 156'; through bore 82, through aperture 98, through interior bore 94, through aperture 100, and into outlet passage 86 and conduit 134.

Conduit 134 is connected to a T-valve 186 which controls flow into the opposite end of cylinder 168 and supply conduit 188. The pressure passes through conduit 134 and moves piston 170 outwardly, extending rod 176 from cylinder 168 and causing collar 180 to move rod 184. Rod 184 rotates shaft 160 in a counterclockwise direction, moving chamber 18 to a lower position than chamber 20, causing gravity flow of the fluid in the opposite direction through needle valve 24.

Supply conduits 164 and 188 are connected to opposite sides of a pressure actuated device such as valve 190 illustrated in the preferred embodiment in FIG. 1. The valve element has a piston 192 in cylinder 194 which moves rod 196, moving valve block 198 having a passage 200 therein, to connect pressure flow line 202 with line 204.

It should be readily apparent from the foregoing that pressure through line 164 from line 136 will close valve element 190 and pressure through line 188 from line 134 will open the valve 190. Other pressure actuated devices such as switches, control arms, etc. may be connected to the time cycle actuator. In addition, either supply line 164 or 184 may be stopped off for use on spring biased actuated devices 190 where only pressure to one side of the actuated device 190 is needed and a spring moves the device in the opposite direction.

Operation of the hereinbefore described device is as follows:

Starting from a position illustrated in FIGS. 2–4 with chamber 18 in a lower position than chamber 20 and leaf spring 76 on the side 74a of knife point 74c, adjacent chamber 20 fluid flows by gravity through passage 28 and valve seat 26, through passage 30, into chamber 18 at a rate determined by the downward movement of valve needle 24 which is controlled by lower stop means 46. Fluid continues to flow at a rate determined by the viscosity of the fluid and the opening of needle valve 24 such that a predetermined amount of time will expire before transferring a predetermined amount of fluid into chamber 18. The predetermined amount of fluid in chamber 18 will create a downward force on chamber 18 which will cause point 74c to move clockwise over spring 76 such that chamber 18 is free to move against bumper 72. At this point end 158 of actuating arm 154 will move against end 150a of cam 150 which moves arm 140, thus pulling arm 138 inwardly.

Valve element 90 is moved toward arm 140 which opens passage 156, allowing pressure from inlet 84 to pass through aperture 102 through interior bore 92 to aperture 104 where it passes into outlet passage 88.

Outlet passage 88 communicates with conduit 136 which applies pressure to reset means 14, retracting rod 176 which pulls rod 184 toward cylinder 168, moving shaft 60 in a clockwise direction. Shaft 60 rotates chamber 20 to a lower position than chamber 18. In addition, pressure is delivered to supply conduit 164 which retracts piston rod 196, closing valve passage 200 to shut off flow through conduits 202 and 204.

This condition remains stable with valve element 90 moved toward arm 140 until a predetermined amount of fluid has flowed from chamber 18, through passage 30, through seat 26, through passage 28, and into chamber 20. The rate of flow would be determined by the viscosity of the fluid and the upper limit of pin 40 which limits the upper position of valve needle element 24 which controls the size of the opening to seat 26.

When a predetermined amount of fluid has flowed into chamber 20, the weight will lower chamber 20, causing knife point 74c to move over spring 76 such that spring 76 returns to the side shown in full outline and chamber 20 moves to bumper 72.

When chamber 20 moves to bumper 72, end 154b of actuating arm 154 moves against end 150b of cam 150, moving arm 138 outwardly and pulling arm 140 inwardly against valve element 90. Valve element 90 is moved to the position shown in FIG. 7, opening passage 156'.

O-ring 106 closes passage 156 and allows pressure from inlet 84 to pass through aperture 98, through interior bore 94, out aperture 100, and into outlet passage 86. Pressure passes into conduit 134, applying pressure to the piston, pushing piston rod 176 outwardly and applying pressure to supply conduit 188. Pressure on supply conduit 188 moves activated valve means 16, extending rod 196, and causing passage 200 to open, allowing flow through conduits 202 and 204.

As piston 170 extends, rod 176 of reset means 14 collar 180 engages rod 184 moving shaft 60 in a counter-clockwise direction to lower chamber 18 below the level of chamber 20, reversing the flow of the fluid therethrough.

It should be readily apparent that bumper 72 limits movement of chambers 18 and 20, and thus movement of ends 154a and 154b of actuating arm 154, limiting the downward movement of cam 150. If cam 150 were moved downwardly too far, the arms might move under the cam thus making it impossible to reverse the cycle.

It should be readily apparent that by changing the viscosity of fluid the limits of time cycle may be changed from a few minutes to several days or even several weeks. By adjusting upper stop limit 44 upwardly the time may be shortened for fluid to flow into chamber 20 creating a very small short cycle for that part of the valve. By adjusting the lower limit stop 46 to its lowest limits the longest cycle may be formed for flow into chamber 18. As hereinbefore discussed, by varying the positions of the stop means, one can vary the time required for the fluid to flow to each chamber and thus the time which actuated means 16 is opened and closed.

It should be readily appreciated that valve means 12 allows very short movement of valve element 90 and is very sensitive. If O-ring 106 is allowed to rest in the central position no flow will flow past inlet 84, thus making it possible by adjustments to have a neutral position of valve means 12. Valve element 90 should have at least one tapered shoulder 90a to allow passage past O-ring 106 without damage thereto.

It should be appreciated that pressure is applied from inlet 84 to the circumference of O-ring 106 evenly around groove 108 in valve body 80 so that very slight movement is all that is necessary to open passage 156 or 156'.

It should also be appreciated that shafts 58 and 60 preferably are located at the lowest point possible on flange 56 to aid in counter-balancing chambers 18 and 20 to alternately lower positions, when reversing the flow of fluid. However, it is not intended to limit the position of shafts 58 and 60.

It should further be appreciated that other and further embodiments of the invention may be devised without departing from the basic concept thereof.

Having described my invention, I claim:

1. A valve comprising a body having a bore formed therein, said bore communicating with an inlet; and said bore further having an annular groove formed in the middle thereof; a valve element having an annular groove formed about the periphery of the valve element dividing the valve element into two equal portions, said valve element further having a bore formed centrally therethrough and a pair of ports formed on opposite sides of the annular groove in the valve element communicating with the bore of the body; a partition to divide said bore in said valve element in half; an O-ring secured in said annular groove on the valve element and the groove formed in the bore of the body such that the inlet is sealed when the O-ring is centrally aligned; a pair of O-rings secured about each end of the valve elements to seal between the valve element and the bore of the body; means to limit longitudinal movement of said valve element in said bore of the body; outlet means formed on each side of the inlet communicating with the bore of the body and each port in the valve element; seal means comprising a pair of seals at opposite ends of the valve; and means to alternately move each said seal means into engagement with the associated end of bore of said valve element, said seal means closing and sealing the end of the bore through said valve element, said seal means further moving said valve element inwardly to connect the inlet with one of the outlet means and open said inlet to allow flow of fluid to the outlet and moving the seal means on the opposite end away from the end of said valve element, to open and to vent the opposite end of the valve element and opposite outlet means to the atmosphere.

2. The combination called for in claim 1 wherein the means to limit longitudinal movement comprises: first and second shoulders formed on opposite ends of the valve element; stop members adapted to fit into said bore on opposite ends of said body to engage said first and second shoulders; and means to secure said stop members in said body such that the valve element may move longitudinally in said bore only a small distance.

3. The combination called for in claim 1 with the addition of: at least one tapered shoulder formed on the valve element adjacent the O-ring to allow passage of the valve element through the O-ring without damaging the O-ring.

4. The combination called for in claim 1 wherein the outlet means comprises: a passage formed in the valve element on each side of the partition, each passage communicating with the bore formed on each side of the partition such that fluid passes from the inlet through one of the passages to the bore of the valve element.

5. The combination called for in claim 1 with the addition of: a shoulder formed on each end of the bore in the body to limit longitudinal movement of the O-rings inwardly.

* * * * *